Sept. 29, 1970    G. D. WOLFF    3,530,672
SPEED SENSING DEVICE Filed Aug. 6, 1968    4 Sheets-Sheet 1

INVENTOR.
GEORGE D. WOLFF
BY
SETTLE, BATCHELDER & OLTMAN.
ATT'YS.

INVENTOR.
GEORGE D. WOLFF.
BY
SETTLE, BATCHELDER & OLTMAN.
ATT'YS.

Sept. 29, 1970 G. D. WOLFF 3,530,672
SPEED SENSING DEVICE
Filed Aug. 6, 1968
4 Sheets-Sheet 3

INVENTOR.
GEORGE D. WOLFF
BY
SETTLE, BATCHELDER & OLTMAN.
ATT'YS.

Sept. 29, 1970   G. D. WOLFF   3,530,672
SPEED SENSING DEVICE
Filed Aug. 6, 1968   4 Sheets-Sheet 4

INVENTOR.
GEORGE D. WOLFF
BY
SETTLE, BATCHELDER & OLTMAN.
ATT'YS.

United States Patent Office 3,530,672
Patented Sept. 29, 1970

3,530,672
SPEED SENSING DEVICE
George D. Wolff, 22565 Statler Blvd.,
St. Clair Shores, Mich. 48081
Continuation-in-part of application Ser. No. 536,400,
Mar. 22, 1966. This application Aug. 6, 1968, Ser.
No. 750,509
Int. Cl. F23n
U.S. Cl. 60—105                    24 Claims

ABSTRACT OF THE DISCLOSURE

Speed sensing devices for generating a pressure signal representative of the speed of a variable speed device. Fluid pressure pulses are generated at a rate proportional to the speed of the device being controlled and transmitted from the pulse generator to a pulse dividing mechanism via a conduit having a length such that a finite length of time is required for the pulse to travel from the generator to the divider. In one type of device, the pulse divider is so arranged that under steady state operation, the incoming pulses are split equally and transmitted to a control element which is positioned in accordance with a pressure differential between the two divided pulse portions. A change from the steady state operation, for example a reduction in speed of the variable speed device, causes the pulses to be divided unequally, thus creating a pressure differential which shifts the control element. Alternatively, the control element may be spring biased and all or a preselected portion only of the arriving pulse may be transmitted from the pulse divider to the control element to urge the control element in opposition to the spring bias. Various modifications are disclosed, such as pulse generators or pulse dividers operable to apply a dither signal to the control element, which may take the form of a servo valve, and further variations are disclosed relating to means for modifying the effect of a speed change on the control element.

REFERENCE TO RELATED APPLICATION

The present application relates to further refinements and modifications to a basic system disclosed and claimed in my copending application Ser. No. 536,400, filed Mar. 22, 1966, now Pat. No. 3,395,718 of which this application is a continuation-in-part.

BACKGROUND OF THE INVENTION

In the system disclosed in my aforementioned Pat. No. 3,395,718, the output of the pulse divider is applied directly to a fluid pressure motor which directly actuates the speed controlling mechanism of the controlled variable speed device. While this arrangement is satisfactory for many applications, the magnitude of the control signal generated is, in general, proportional to the speed change or deviation from steady state operation, and for a very minute speed change, the signal may not be great enough to overcome the inertia, frictional forces and mechanical resistance in the control system. The present invention is thus directed to various means for increasing the sensitivity, work capacity and range of application of the systems disclosed in by Pat. No. 3,395,718.

Various objects, features and advantages of the invention will become apparent by reference to the following specification and to the drawings.

Figure 1:
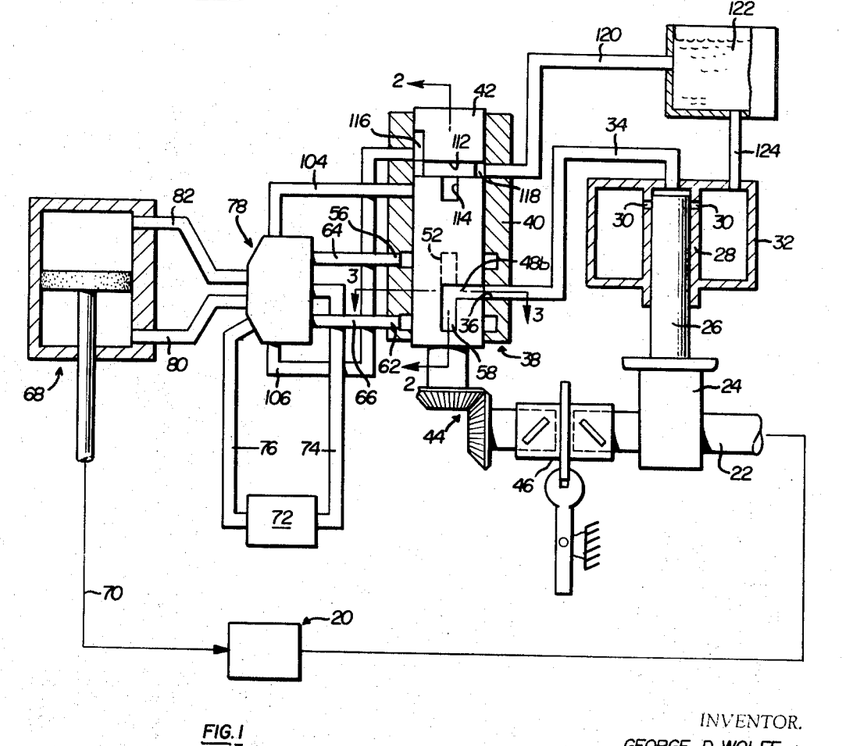
FIG. 1 is a schematic diagram, partially in cross section, showing one exemplary system embodying the present invention.

Referring first to FIG. 1, there is disclosed a speed sensing control system of the type disclosed in my Pat. No. 3,395,718. The system as disclosed in FIG. 1 is employed to control the speed of a variable speed motor, schematically illustrated at 20 having a driven shaft 22.

A cam 24 mounted upon shaft 22 drives a pressure pulse producing piston 26 in reciprocation within a cylinder 28. In FIG. 1, the piston 26 is shown near its upper limit of movement, at which the piston head is projected above a pair of inlet passages 30 through which fluid passes, when unblocked by the piston in its lowered position, from a reservoir 32 into the interior of cylinder 28. Each upward stroke of piston 26 to the position shown in FIG. 1 generates a pulse of pressure which passes from the upper end of cylinder 28 into a delay conduit 34, through which the pulse is transmitted to the inlet port 36 of a pulse divider designated generally 38.

Figure 3:
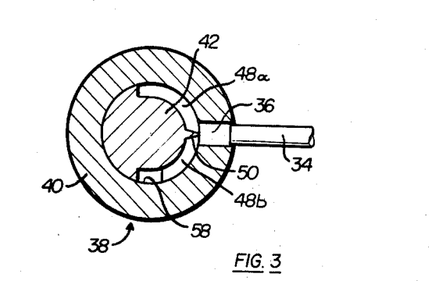
FIG. 3 is a detail cross sectional view taken on line 3—3 of FIG. 1.

Pulse divider 38 includes a housing 40 within which a rotary dividing member 42 is driven in rotation from shaft 22 via a bevel gear coupling 44 and an angularly variable shaft coupling 46. Rotary member 42 is formed with recess portions 48a, 48b (FIG. 3) which extend partially around the circumference of member 42 at a location which is aligned with inlet port 36. The two recess portions 48a and 48b are separated from each other by a narrow dividing lip 50, best shown in FIG. 3.

Recess 48a communicates with an upwardly extending axial groove 52 which in turn communicates with an annular groove 54 in the interior of housing 40 having an outlet port 56. Recess 48b communicates with a downwardly extending axial groove, (as shown in FIG. 1) which in turn communicates with a second annular groove 60 in housing 40 having an outlet port 62. Outlet ports 56 and 62 in turn communicate with conduits 64 and 66 respectively.

As explained in greater detail in my Pat. No. 3,395,718, as long as shaft 22 is driven at a constant speed by variable speed drive 20, the pressure pulses produced by the reciprocation of piston 26 pass through delay conduit 34 and arrive at the inlet port 36 of the pulse divider in phase with the rotation of member 42 so that dividing lip 50 splits each incoming pulse into two substantially equal parts. Thus, over a sustained period of constant speed operation, the pressure in outlet conduits 64 and 66 is the same.

If, however, the speed of shaft 22 should change, the relationship between the time of arrival of the pulse and the rotative position of lip 50 at the time of arrival will change. Assuming that member 42 is rotating in a clockwise direction as viewed in FIG. 3, if shaft 22 slows down, dividing lip 50 will not have reached the mid position relative to port 36 shown in FIG. 3 at the time the pulse arrives because the time the pulse needs to traverse delay conduit 34 will remain essentially constant while the time interval between pulse generation and arrival of the lip 50 in mid position of port 36 will increase with decreasing shaft speed. Thus, in this situation a larger portion of the pulse would enter recess 48b, while a smaller portion of the pulse would enter recess 48a, in view of the fact that the dividing lip would not yet have reached the three o'clock position shown in FIG. 3. Conversely, should the speed of shaft 22 increase, dividing lip 50 would have travelled a greater rotative distance during the fixed period of time of transit of the pulse through delay line 34 and thus the dividing lip would be slightly below the three o'clock position when the pulse arrived. This would cause a larger portion of the pulse to enter recess 48a and a corresponding smaller portion of the pulse to enter recess 48b.

This assuming a change in speed of shaft 22, as by the application of a greater load to the shaft driving mechanism, pulse divider 38 functions to divide each of the pressure pulses in a proportion in accordance with the magnitude and direction of the change, and this unequal division creates a pressure imbalance between conduits 64 and 66, thus generating a pressure signal which may be employed to actuate a control member so as to increase or decrease the speed of the variable speed drive 20 to restore the desired constant speed.

The apparatus described thus far is disclosed and described in greater detail in my aforementioned Pat. No. 3,395,718. The system disclosed in Pat. No. 3,395,718 found conduits 64 and 66 connected directly to a differential pressure motor which was in turn connected to the variable speed drive to control its operation. In the system disclosed in FIG. 1, the differential pressure motor 68 which is coupled to the variable speed drive by suitable mechanism schematically indicated at 70 to control operation of the drive, is not connected directly to output conduits 64 and 66. Instead, operation of differential pressure motor 68 is from a secondary source of pressure 72 having a servo fluid supply line 74 and a servo fluid return line 76 which are hydraulically connected to motor 68 via a servo valve 78 and rod and head end conduits 80 and 82 respectively.

Figure 4:
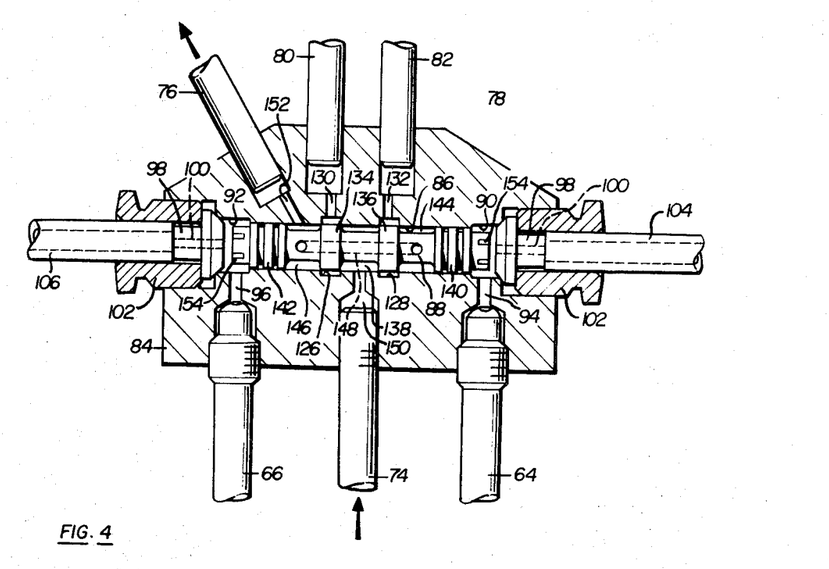
FIG. 4 is a longitudinal cross sectional view of the servo valve of FIG. 1.

Details of servo valve 78 are best seen in FIG. 4 of the drawings. The valve includes a housing designated generally 84 having a main central bore 86 within which a valve spool 88 is mounted for sliding movement. At opposite ends of bore 86, enlarged diameter portions 90 and 92 define chambers which communicate with conduits 64 and 66 via internal passages 94 and 96 respectively.

Valve spool 88 is shifted axially within bore 86 in accordance with the pressure differential between chambers 90 and 92, the pressure in these chambers in turn being influenced by the operation of the pulse divider which divides its incoming pulses between conduits 64 and 66 in accordance with speed changes of shaft 22 as described above.

Figure 2:
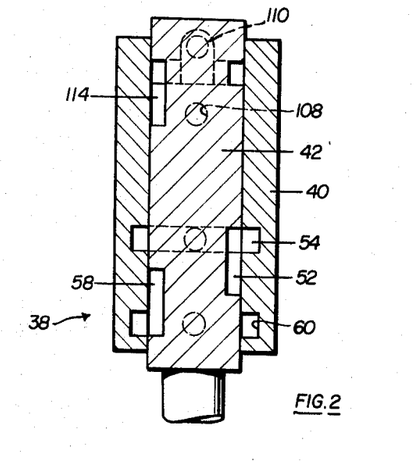
FIG. 2 is a detail cross sectional view taken on line 2—2 of FIG. 1.

Chambers 90 and 92 are vented at a controlled rate through intermittently opening orifices 110 and 108 in the pulse divider shown in FIG. 2 with which they communicate via lines 106 and 104 respectively. Rotary member 42 of the pulse divider is formed with an annular groove 112 and axial grooves 114 and 116 which, when rotatively aligned with orifices 108 and 110 respectively place conduits 104 and 106 in communication with annular groove 112. An outlet port 118 communicates with groove 112 and a conduit 120 conducts fluid from port 118 to a reservoir 122 from which the fluid can flow via conduit 124 into reservoir 32 of the pulse divider.

Bore 86 of servo valve 78 is formed with a pair of enlarged diameter annular recesses 126 and 128 which respectively communicate with conduits 80 and 82 via passages 130 and 132. When valve spool 88 is in its centered position, as illustrated in FIG. 4, the recesses 126 and 128 are spanned by lands 134 and 136 on the valve spool, the lands being fitted to the body of the spool 88 so that a central chanmber 138 is defined within bore 86 in the region between lands 134 and 136. At each end of valve spool 88 a sealing section 140 and 142 is formed, the sealing sections being in sliding sealing engagement with the wall of bore 86. Outer chambers 144 and 146 are thus defined within bore 86, chamber 144 being located between land 136 and sealing section 140, and chamber 146 being located between land 134 and sealing section 142. These latter two chambers 144 and 146 are in communication with each other by means of an internal bore 148 through valve spool 88, which bore opens into both of chambers 144 and 146.

The servo fluid supply line 74 of pressure source 72 communicates via a passage 150 with the central chamber 138 defined by the axial spacing between lands 134 and 136. The servo fluid return line 76 to pressure source 72 communicates via a passage 152 in valve housing 84 with the chamber 146. Because of the communication via passage 148 through the valve spool, both of the outer chambers 144 and 146 are in constant communication with the low pressure return line 76 of pressure source 72, while the axial movement of valve spool 88 is limited, by spacers 154 at opposite ends of the spool so that the supply line 74 of pressure source 72 is always in communication with the chamber 138 between the two lands 134 and 136 of the spool.

With valve spool 88 in its centered position as shown in FIG. 4, the two lands 134 and 136 seal chamber 138 from both of recesses 126 and 128, pressure source 72 being provided with a suitable overload by-pass. Lands 134 and 136 likewise block communication between recesses 126 and 128 and the two outer chambers 144 and 146. This action blocks flow to or from conduits 80 and 82, thus holding the differential pressure motor 68 in position.

Valve spool 88 remains in its centered position as long as shaft 22 is being driven at the selected speed at which pulse divider 38 splits the incoming pulses equally, thus maintaining equal pressures in conduits 64 and 66 to thereby apply equal and oppositely directed pressures in chambers 90 and 92 against the opposite ends of the valve spool.

As described above, a change in speed in shaft 22 will result in an unequal division of the incoming pulses by pulse divider 38. In the case of a slow down in the speed of shaft 22, a larger portion of the pulse will be diverted into conduit 66 and a correspondingly smaller portion of the pulse will be diverted into conduit 64. This will cause the pressure in chamber 92 to exceed that in chamber 90, thus resulting in a pressure imbalance on valve spool 88 tending to move the spool to the right from its centered position shown in FIG. 4.

Movement of valve spool 88 to the right shifts lands 134 and 136 out of alignment with recesses 126 and 128 to place chamber 138 in communication with recess 128 and to place the left-hand chamber 146 in communication with recess 126. This action thus allows fluid under pressure to flow from supply line 74 through chamber 138 and recess 128 into passage 132 and thence to conduit 82. At the same time, conduit 80 is connected to the servo fluid return line 76 via passage 130, chamber 146 and passage 152. This action creates a movement in the differential motor causing the motor to stroke downwardly as viewed in FIG. 1, and this movement of the differential pressure motor is employed to manipulate the speed controlling device on variable speed drive 20 in a direction tending to increase the speed of the drive, to restore shaft 22 to its originally selected speed.

It will be appreciated that the paths travelled by the divided pulse portions through conduits 64 and 66 are normally selected so that the two portions of the pulse arrive to act on the valve spool at substantially the same time. While it is convenient in describing the system to assume that the entire pulse arrives at the pulse divider at the same instant, in practice this is not the case—i.e.

the pulse is generated over a finite period of time proportional to the time required for piston 26 to travel from above ports 30 to the top of its stroke. Thus, the pressure wave which travels through delay line 34 has a finite length and its leading portion reaches the pulse divider at a point in time before the trailing end of the pulse. Thus, if dividing lip 50 were precisely in the middle of port 36 at the instant that the leading portion of the pulse arrived at the dividing lip, a greater portion of the pulse would pass into recess 48a, because during the time interval between the arrival of the leading portion and trailing end of the pulse at the dividing lip, the lip would have rotated in a clockwise direction beyond the exact three o'clock position. Thus, while it is convenient for purposes of explanation to imagine the dividing lip 50 as being substantially stationary throughout the total time of arrival of the pulse, it should be borne in mind that a finite period of time is required for the entire pulse to arrive, and during this time dividing lip 50 is driven through a finite angular increment. The proportionate division of the pulse would be represented by the angular position of dividing lip 50 midway through this rotative increment.

From the foregoing, it follows that in the case of a pulse which is divided exactly in half, during the initial stages of the division of the incoming pulses, a greater portion of the pulse goes into recess 48b, while in the final stages of the division of the pulse, a greater portion goes into recess 48a. The pressure in conduit 66 would thus reach a peak earlier than the pressure in conduit 64.

Therefore, it may be desirable under the foregoing conditions to make conduit 66 slightly longer than conduit 64 so that the peak pressures exerted by the divided pulse portions arrive to act on the valve spool at the same instant.

It will be appreciated that the pressure differential generated by the unequal division of a single pressure pulse is of a relatively small magnitude especially for a small speed deviation. The forces applied by servo pressure source 72 to valve spool 88 are always in balance, and thus do not affect the shifting movement of spool 88. Thus, positioning of the spool can be accomplished by the relatively small pressure differential signals available from the pulse divider, independently of the servo fluid flow and pressure supplied by pressure source 72. This permits the use of pressures and/or flow rates to operate the speed controlling differential pressure motor 68 which may be far in excess of those available from a relatively minute control signal. Further, servo valve 78 isolates the fluid employed to operate differential pressure motor 68 from the fluid employed in the control signal system which includes the pulse generator and pulse divider. This affords the opportunity of employing different fluids in the pulse dividing system and the servo system.

The system described above employs in a steady state operating condition, a balanced pressure at opposite ends of valve spool 88 so that the spool 88 remains stationary as long as steady state operation is maintained. As previously mentioned, the pressure differential created by an unequal pulse division may not be of great magnitude, and in the normal situation, a relatively small change in the speed of the shaft—i.e. from a 50—50 division of the pulse to a 51–49 division of the pulse—may not immediately create a sufficient pressure differential across spool 88 to overcome the inertia and static frictional forces of the valve spool and shift the spool.

To increase the sensitivity of the system to relatively small changes in speed, a so-called "dither" effect may be applied to valve spool 88. This is accomplished by subjecting valve spool 88 to the action of pressure imbalances which tend to rapidly reciprocate the valve spool in extremely small amplitude strokes. This action has the effect of reducing or substantially eliminating static frictional forces resisting movement of the valve spool, thus making the spool more sensitive to small pressure differentials.

While the following description discusses the application of a dither effect to valve spoon 88, this effect has equal applicability in systems where the pulse divider is connected directly to the controlling differential pressure motor as in my Pat. No. 3,395,718.

Figure 5:
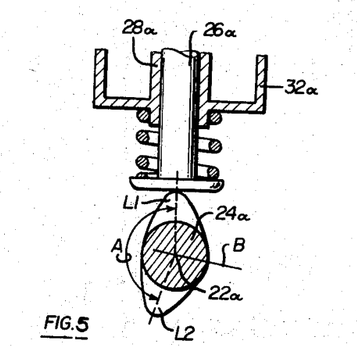
FIG. 5 is a detail view, partially in section, of a modified form of pulse generator.
Figure 6:
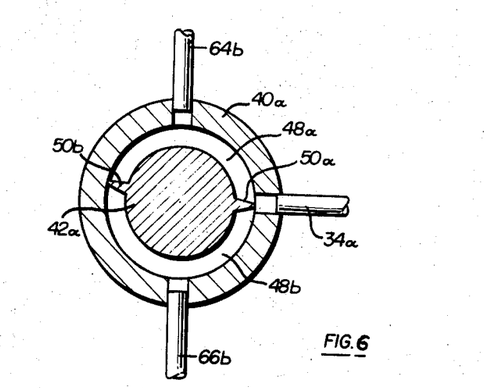
FIG. 6 is a detail cross sectional view, similar to FIG. 3, showing a modified form of pulse divider.

Two arrangements for applying a dither effect are disclosed in FIGS. 5 and 6.

In FIG. 5, the dither effect is provided by a modified form of pulse generator. As in the previously described embodiment, a piston 26a corresponding to piston 26 is driven in reciprocation within a cylinder 28a, corresponding to cylinder 28, by a cam 24a fixedly mounted upon the driven shaft 22a. The pulse generator of FIG. 5 differs from that disclosed in FIG. 1 in that the cam 24a is a two lobe cam, while the cam in the FIG. 1 embodiment took the form of a simple single lobe or eccentric cam. The two lobes or high points L1 and L2 of cam 24a are angularly offset with respect to each other so that the time interval between the generation of successive pulses is not the same. The pulse generator shown in FIG. 5 is synchronized with the pulse divider previousy described above by providing a 2:1 gear ratio in bevel gear 44 to that the rotating member 42 of the pulse divider makes two complete revolutions for each single revolution of the driven shaft 22a. Because of the angular offset between the two lobes L1 and L2, under constant speed operating conditions the pulses arriving at the pulse divider are always out of phase with dividing lip 50, the arriving pulses being alternately delayed and advanced because of the difference in time intervals between the generation of successive pulses.

Assuming two lobes L1 and L2 of the same configuration and the smaller included angle A between the respective lobes L1 and L2 to be 170°, and the larger angle, consequently, to be 190° the time sequence of the emission of the pulses will correspond to these angles. Then there will be alternately short and long time intervals between successive pulses traversing the delay line. Thus, assuming a clockwise direction of rotation of shaft 22a as viewed in FIG. 5 under steady state operation, the pulses generated by lobe L1 would arrive at the divider at a time when the dividing lip 50 had rotated 10° past its mid position, while the pulses generated by lobe L2 would arrive at the pulse divider when dividing lip 50 was 10° short of its mid position.

This arrangement would result in the output lines 64 and 66 of the pulse divider receiving alternate high and low pressure signals tending to drive a differential pressure responsive element connected between them in rapid small amplitude oscillation.

In actual practice, the element coupled to respond to a pressure differential from the pulse divider need not actually move—i.e. the force developed by the dither signal might not be great enough to completely overcome the static frictional forces resisting movement of the element. The function of the dither signal is to produce a force which will substantially, but not necessarily totally, overcome the static frictional force, thus enabling a control signal to more effectively shift the differential pressure responsive element.

An alternative form of dither device is dsclosed in FIG. 6. In the FIG. 6 arrangement, the pulse divider is modified from the FIG. 3 configuration by forming the dividing element with two dividing lips 50a and 50b.

If the pulse divider of FIG. 6 is employed with a single lobe pulse generating cam such as that disclosed in FIG. 1, then the bevel gear interconnection between the driven shaft and rotating pulse divider member 42a will be such that the rotary speed of dividing member 42a is one-half of that of the pulse generating cam 24.

It is believed apparent that the arrangement of FIG. 6 operates in a manner such that the pulse divider output is the same as was the case in the FIG. 5 embodiment described above. In the FIG. 6 arrangement, pulses are generated at constant intervals under steady state operating conditions, but the dividing lips 50a and 50a' are slightly out of phase so that the arriving pulses are always divided unequally under steady state operating conditions. Assuming clockwise rotation of rotary element 42a as viewed in FIG. 6, lip 50b is somewhat advanced in phase, while lip 50a is slightly delayed in phase so that alternately the major or minor portions of the pulse will go into recesses 48a, 48b, respectively. Recesses 48a and 48b are connected to one of the respective pulse divider output conduits 64 or 66.

As implied from the foregoing description, the present invention is capable of rapid response and, when employed with a servo control system is operable to produce a fast response to a relatively small control signal.

In certain applications, precautions must be taken to avoid too rapid a control actuation. For example, the sudden application of a large load to an engine employing the control system of FIG. 1 could result in a drastic reduction in speed of shaft 22. A large speed reduction would cause differential pressure motor 68 to immediately drive the engine controlling throttle to its maximum speed condition. A too sudden acceleration to the engine could cause the engine to stall.

Figure 7:
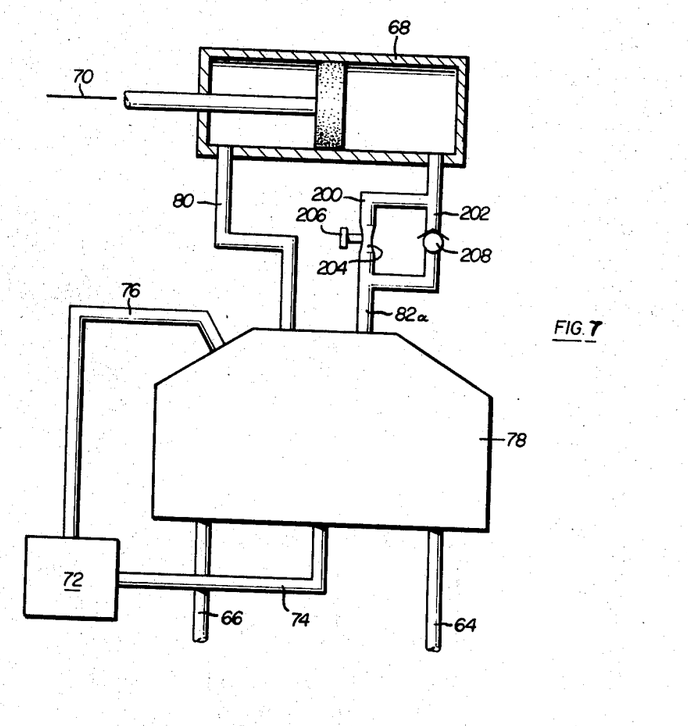
FIG. 7 is a schematic diagram of a modification of the system of FIG. 1.

To avoid this possibility, an arrangement such as that disclosed in FIG. 7 may be employed. The system of FIG. 7 is identical to that disclosed in FIG. 1, with the exception that one of the conduits 82a, corresponding to conduit 82 of FIG. 1, has been modified to include parallel branches 200 and 202. Branch 200 is provided with a flow restricting orifice 204, preferably of an adjustable type as schematically indicated at 206. The remaining branch 202 is provided with a one-way check valve 208 oriented to block flow of fluid from servo valve 78 to motor 68 while permitting flow of fluid from motor 68 to servo valve 78.

Where it is desired to limit the acceleration of the controlled motor, the mechanical connections are such that acceleration is achieved by supplying pressured fluid from source 72 to conduit 82a. The restricted orifice 204 in branch 200 of conduit 82a limits the rate at which fluid can flow through this branch, thus limiting the rate of movement to the right-hand side of the differential motor piston. Flow of fluid from servo valve 78 to motor 68 must go through orifice 204, because check valve 208 prevents the flow of fluid in this direction. The arrangement shown in FIG. 7 does not influence the rate of response of motor 68 in the opposite direction, since the check valve, when combined with orifice 204 permits substantially the same flow as would a single unrestricted conduit.

Figure 8:
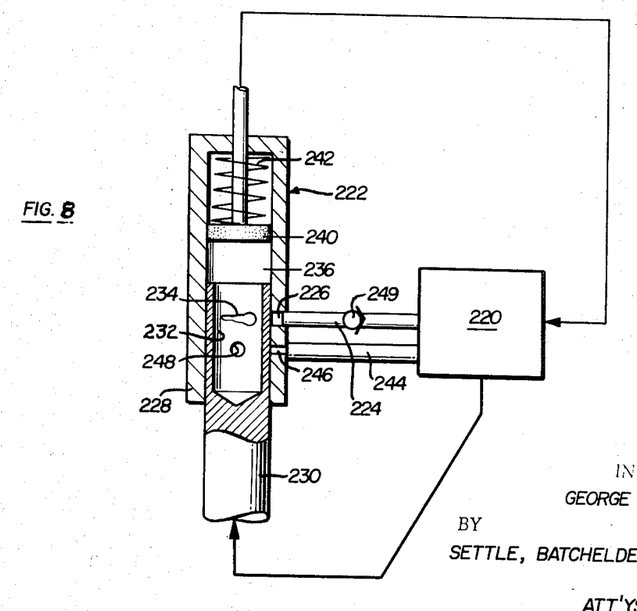
FIG. 8 is a schematic diagram of a modified form of pulse divider.

In FIG. 8, there is disclosed a modified form of pulse divider which may be employed where a specific pressure-speed relationship is desired. In FIG. 8, the variable speed drive and pulse generator have been schematically illustrated at 220. A modified form of pulse divider designated generally 222 receives pulses transmitted to it via a delay conduit 224, the pulses entering divider 222 at a port 226 in housing 228. Within the housing, the rotary pulse dividing member 230 is driven in rotation from the driven shaft 22 shown in the FIG. 1 embodiment. The upper end of rotary member 230 is bored to form a sleeve portion 232 and a shaped orifice 234 is cut through the wall of sleeve 232 to be exposed to port 226 during rotation of member 230. The shape of orifice 234 varies in its axial extent, and it is believed apparent that variations in the phase relationship between the time of arrival of the pulse and the rotative position of shaft 230 will vary the effective cross sectional area of orifice 234 aligned at that time with port 226. By suitable shaping of orifice 234, a desired relationship between the magnitude of the transmitted pulse and the rotative position of shaft 230 can be achieved, and thus, in effect, a variable orifice versus speed.

Figure 9:
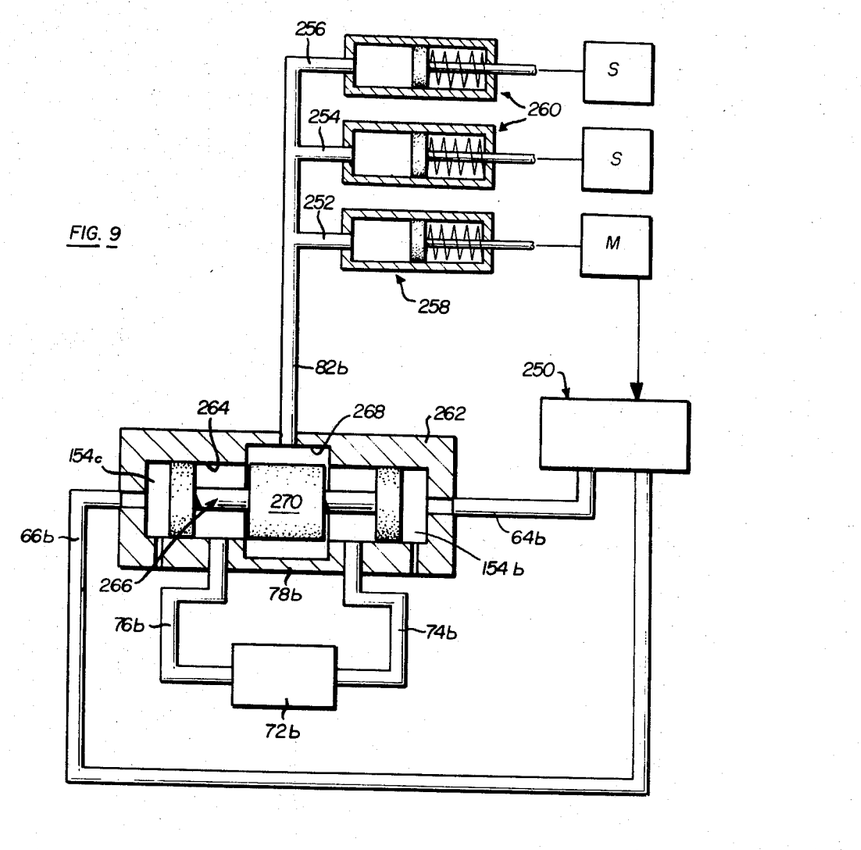
FIG. 9 is a schematic diagram showing a system generally similar to that of FIG. 1 employed to control operation of a plurality of prime movers.

That portion of the pulse which passes through orifice 234 increases the pressure within a chamber 236 in housing 228 within which a piston 240 is biased by spring 242 downwardly viewed in FIG. 9, in opposition to the pressure existing in chamber 236.

It is believed apparent that piston 240 will assume a position of equilibrium at which the spring force of spring 242 is counterbalanced by the pressure existing in chamber 236 and that upon a change in pressure, piston 240 will shift until the spring force and chamber pressure are again balanced. Chamber 236 is vented at a controlled rate as by a conduit 244 connected to a port 246 in housing 228 which cyclically communicates with chamber 236 via a hole 248 through sleeve 232.

A one-way check valve 249 in the delay line prevents flow of fluid outwardly through inlet port 226 when the port and orifice are aligned.

In FIG. 9, a modified form of the system of FIG. 1 is shown employed to regulate simultaneously the operation of a plurality of controlled units in accordance with a control signal derived from one of the units. One particular example of an arrangement of this type would be the control of a plurality of generator sets to assure an equal distribution of the load among the generator sets.

In FIG. 9, a pulse generator and pulse divider such as those disclosed in FIG. 1 are schematically indicated at 250, the driven shaft speed being derived from a master generator set M so that the output of the pulse generator to conduits 64b and 66b (corresponding to conduits 64 and 66 of FIG. 1) varies in accordance with speed variations of the master generator set M. As in FIG. 1, conduits 64b and 66b are connected to a servo valve 78b whose construction differs from that of FIG. 4: a servo pressure source 72b is connected by a supply line 74b and a return line 76b to the servo valve as in the previous case. In the arrangement of FIG. 9, a single outlet conduit 82b of the servo valve is connected in parallel to three fluid motors as by branch conduits 252, 254, and 256. Each of the three motors includes a cylinder enclosing a piston which is spring biased to the left in opposition to pressure supplied to the cylinder from conduit 82b. One of the motors, 258, is operatively coupled to control the speed of the master generator set M; the remaining motors 260, each being operatively coupled to control the operation of a slave generator set S. Preferably means, not shown, are provided for individually adjusting the biasing action of the motor springs to enable accurate matching of the applied control to match load distribution between the generator sets.

Servo valve 78b is formed with a housing 262 having a central bore 264 within which a valve spool 266 is slidably positioned in accordance with the pressure differential existing at opposite ends of the spool. This differential is supplied as in the previous case from the pulse divider via conduits 64b and 66b which correspond to the conduits 64 and 66 respectively of the FIG. 1 embodiment. An enlarged diameter central section 268 in bore 264 is of slightly greater axial extent than is a central land 270 on the valve spool. Thus, when valve spool 266 is centered, the conduits 74b, 76b and 82b all communicate with each other with a restricted flow of fluid occurring through the small axial gaps at the opposite ends of land 270.

A slight movement of the valve spool in either direction from its centered position will tend to close one of the gaps, while widening the other one thus increasing or decreasing the pressure in the enlarged diameter section 268 dependent upon the direction of movement of spool 266.

In operation, slowing down of master generator set M will create a pulse signal which increases the pressure in chamber 154b and decreases that in chamber 154c, thus creating a pressure differential across valve spool 266 moving valve spool 266 to the left from its centered position. This movement reduces communication between the enlarged diameter section 268 and return conduit 76b while increasing communication between pressured conduit 74b and section 268, thus increasing the pressure in conduit 82b and hence in each of motors 258 and 260. The increased pressure is applied equally to all of the motors causing them to stoke to the right as viewed in FIG. 10 to increase the speed of generators M and S, equalization of the controlling action being achieved by adjustment of the individual springs referred to above.

It is believed apparent that movement of valve spool 266 to the left in response to an increased speed signal from the pulse divider will throttle the flow from conduit 74b into the enlarged diameter section 268 while increasing communication between conduit section 268 and return conduit 76b to thereby reduce pressure in conduit 82b and the motors 258 and 260.

Under steady state operation the flow of fluid under pressure from pressure conduit 74b through the axial gap at the right side of land 270 of the centered valve spool is balanced by the flow of fluid from enlarged diameter section 268 past the axial gap at the left end of land 270 into the return conduit 76b, thus maintaining a constant pressure in section 268 and hence in motors 258 and 260.

Figure 10:
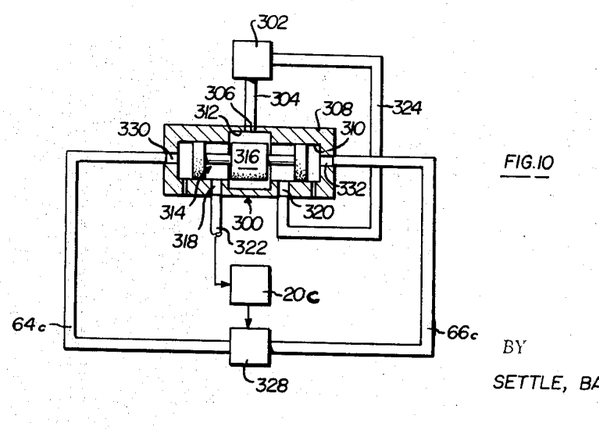
FIG. 10 is a schematic diagram of another form of control system.

The systems described above are all directed to systems in which the control signal is applied to a control element in the form of a fluid pressure responsive motor whose piston is employed to actuate a mechanical linkage, such as an engine throttle. In FIG. 10, a valve designated 300 of construction similar to that of valve 78b of FIG. 9 is shown employed directly in the fuel line of the engine 20c being controlled. Engine 20c may be considered an internal combustion engine or turbine. In the system of FIG. 10, a pressurized fuel supply 302 is connected by means of a conduit 304 to a port 306 of valve 300. As in the FIG. 9 embodiment, the valve 300 includes a valve housing 308 having a bore 310 which has an enlarged diameter central portion 312 which is in communication with port 306. A valve spool designated generally 314 is slidably mounted within bore 310, the valve spool including a central land 316 having a diameter equal to that of bore 310, but of an axial length slightly less than that of enlarged central portion 312 so that fuel from the supply 302 can flow at a restricted rate past both sides of land 316 when the spool is in its centered position and thus pass from port 306 to both of ports 318 and 320 as long as the valve is centered. Port 318 is connected by a conduit 322 which conducts the fuel to the turbine or internal combustion engine represented at 20c. Port 320 is connected via a return conduit 324 to the fuel supply.

As in the FIG. 9 embodiment, the controlled device 20c drives a pulse divider and generator system 328 which may be similar to that disclosed in FIG. 1, the outlet conduits 64c and 66c, corresponding to conduits 64 and 66 of FIG. 1 being connected to ports 330 and 332 of the valve to position the valve spool in accordance with speed changes of the motor.

The flow of fuel to engine 20c is determined by the position of valve spool 314, movement of the spool to the right from its centered position increasing the flow of fuel into conduit 322 to cause the engine to speed up; movement of the spool to the left increasing the flow of fuel into return line 324 and simultaneously decreasing the flow to engine 20c.

While various embodiments of the invention have been described in detail, it will be apparent to those skilled in the art that the various embodiments are capable of a wide variety of modification as to the arrangement, disposition and form of the parts or/and combination of the basic elements without departing from the principles of the present invention. Therefore, the foregoing description is to be considered exemplary rather than limiting, and the true scope of the invention is that defined in the following claims.

I claim:
1. In a system for controlling the operation of a variable speed device, said system including a pressure pulse generating means and a pressure pulse dividing means both driven in cyclic operation by said variable speed device to respectively generate and divide pulses at rates proportional to the speed of said variable speed device, a delay line for conducting pressure pulses from said generating means to said dividing means with a finite time delay, said pulse dividing means being operable to divide each arriving pulse into two pulse portions related to each other in accordance with the relation of the actual speed of said variable speed device to a preselected speed, and pressure responsive means connected to said pulse dividing means operable in response to pulse portions transmitted thereto from said pulse dividing means to adjust the speed of said variable speed device; the improvement wherein said pressure responsive means comprises a source of fluid under pressure, means operable to adjust the speed of said variable speed device in response to fluid supplied thereto from said source, control means having a control element actuable to control the supply of fluid from said source to said means operable and means for actuating said control element in response to pulse portions transmitted to said control means from said pulse dividing means.

2. In a system as defined in claim 1, the further improvement wherein said control means comprises a housing having a pair of chambers and a bore extending between said chambers, said control element comprising a valve spool slidable in said bore in response to a pressure differential between said chambers, a pair of conduits respectively connecting said chambers to said pulse dividing means to transmit one of the two portions of each divided pulse to one of said chambers and to transmit the other of the two portions to the other of said chambers, and means for venting said chambers at a controlled rate.

3. In a system as defined in claim 1, the further improvement wherein said source of fluid under pressure comprises a high pressure output conduit and a low pressure return conduit respectively connected to an inlet port and an outlet port in said control means, said control means having a pair of control ports, control conduit means connecting said control ports to said means operable, said control element being operable in a central neutral position to block communication between all of said ports, to connect said inlet port to one of said control ports and to connect the other of said control ports to said outlet port upon displacement of said control element to one side of said neutral position, and to reverse the connections between said inlet and outlet ports and said control ports upon displacement to the other side of said neutral position.

4. In a system as defined in claim 3, the further improvement comprising means in one of said control conduit means for adjustably restricting the flow of fluid through said one of said control conduit means in one direction.

5. In a system as defined in claim 4, the further improvement wherein said means operable comprises a differential pressure motor, and said means for adjustably restricting comprises a pair of parallel branches in said one of said control conduit means, an adjustable restricting orifice in one of said parallel branches, and a one-way check valve in the other of said parallel branches oriented to block flow of fluid in said one direction.

6. In a system as defined in claim 2, the further improvement wherein said means operable comprises a fluid pressure motor spring biased in one direction and movable against the spring bias in accordance with pressure supplied to said motor from said source said valve spool having a central land, means defining an enlarged central section in said bore having an axial extent slightly greater than said central land, a single control conduit hydraulically connecting said central section to said motor to supply pressure thereto, a pair of ports communicating with said bore at locations spaced axially outwardly from opposite ends of said central section, said pressure source having a high pressure outlet conduit connected to one of said ports and a low pressure return line connected to the other of said ports.

7. The invention as defined in claim 6 wherein said outlet conduit is connected in parallel to a plurality of fluid pressure motors, each of said motors controlling one of a plurality of variable speed devices, one only of said variable speed devices driving said pulse generating and pulse dividing means.

8. The invention defined in claim 1 wherein said source comprises a supply of fluid fuel for said variable speed device.

9. In a system for controlling the operation of a variable speed device, said system including a pressure pulse generating means and a pressure pulse dividing means both driven in cyclic operation by said variable speed device to respectively generate and divide pulses at rates proportional to the speed of said variable speed device, a delay line for conducting pressure pulses from said generating means to said dividing means with a finite time delay, said pulse dividing means being operable to divide each arriving pulse into two pulse portions related to each other in accordance with the relation of the actual speed of said variable speed device to a preselected speed, and pressure responsive means including a control member movable to adjust the speed of said variable speed device in response to a signal constituted by pulse portions transmitted to said pressure responsive means from said pulse dividing means; the improvement comprising means for modifying the response of said control member to changes in speed of said variable speed device falling within a preselected range.

10. The invention defined in claim 9 wherein said means for modifying the response of said control member means for limiting the rate of movement of said control member in one direction to a rate less than the rate of movement of the control in the opposite direction whereby the rate of response of said control member to an increase in speed of said variable speed device differs from the rate of response of said control member to a decrease in speed of said variable speed device.

11. The invention defined in claim 10 wherein said pressure responsive means comprises a defferential pressure motor having a rod end conduit and a head end conduit and a piston constituting said control member movable in response to a pressure differential between said conduits, said means for limiting the rate of movement comprising means in one of said conduits for limiting the rate of flow of fluid through said one of said conduits in a direction toward said motor while permitting substantially unrestricted flow through said one of said conduits in the opposite direction.

12. The invention as defined in claim 11 wherein said means in said one of said conduits comprises a pair of parallel branch conduits, one of said branch conduits having an adjustable restricted orifice therein for controlling the rate of flow of fluid through said one of said branch conduits, the other of said branch conduits having a one-way check valve therein oriented to block flow of fluid through said other of said branch conduits in a direction toward said motor.

13. The invention as defined in claim 9 wherein said pressure responsive means comprises a pair of conduits connected to said pulse dividing means, one of said conduits receiving one portion of each divided pulse and the other of said conduits receiving the other portion of each divided pulse and said control member being movable in response to a pressure differential between said conduits; the improvement wherein said means for modifying the response of said control member comprises means for alternately increasing and decreasing the magnitude of one portion of the divided pulse relative to the other to apply a dither effect to the signal.

14. The invention as defined in claim 13 wherein said last-named means comprises means for driving said pulse dividing means at a cyclic rate which is a whole number $n$ times that of the cyclic rate of said pulse generating means, and means on said pulse generating means for generating $n$ pulses during each complete cycle of operation.

15. The invention defined in claim 13 wherein said last-named means comprises means for driving said pulse generating means at a cyclic rate equal to a whole number $n$ times that of the cyclic rate of said pulse dividing means, means on said pulse dividing means for dividing $n$ successive pulses during each complete cycle of operation of said pulse dividing means.

16. The invention defined in claim 15 wherein said pulse dividing means comprises a housing having a bore therein communicating with an inlet port, said delay line communicating with said inlet port, a pair of outlet ports communicating with said bore at symmetrically spaced positions at opposite sides of said inlet port, a rotatable pulse dividing member rotatably mounted within said bore and driven in rottaion by said variable speed device, said dividing member having an annular groove therein axially aligned with said inlet and outlet ports, said groove being interrupted at two points by a pair of dividing lips extending axially across said groove to divide said groove into two non-communicating portions the circumferential extent of one of said portions being less than the circumferential extent of the other.

17. The invention as defined in claim 9 wherein said pulse dividing means comprises a housing having a port therein, a pulse dividing member rotatably mounted within said housing and driven in rotation by said variable speed drive, and orifice means in said member for placing said delay line in communication with said pressure responsive means when said orifice means overlaps said port in said housing, the overlapped cross sectional area of said port and said orifice means varying in accordance with the angular rotative position of said dividing member.

18. The invention defined in claim 17 further comprising one-way check valve means for preventing flow of fluid outwardly through said inlet port.

19. The invention defined in claim 17 wherein said dividing member comprises a hollow sleeve rotatably mounted within a bore in said housing in axially overlapping relationship to said port, said orifice means comprising a shaped aperture in said sleeve.

20. The invention defined in claim 19 wherein said sleeve opens at one end into said bore in said housing, and said control member comprises a piston slidably mounted in said bore and having one face exposed to said open end of said sleeve, and spring means biasing said piston toward said open end of said sleeve.

21. In a system for controlling the operation of a variable speed device, said system including a pressure pulse generating means and a pressure pulse dividing means both driven in cyclic operation by said invariable speed device to respectively generate and divide pulses at rates proportional to the speed of said variable speed device, a delay line for conducting pressure pulses from said generating means to said dividing means with a finite time delay, said pulse dividing means being operable to divide each arriving pulse into two pulse portions related to each other in accordance with the relation of the actual speed of said variable speed device to a preselected speed, and pressure responsive means including a control member movable to adjust the speed of said variable speed device in response to a signal constituted by pulse portions transmitted to said pressure responsive means from said pulse dividing means; the improvement comprising a pair of conduits connecting said pulse dividing means to said pressure responsive means, one of said conduits transmitting one of the two portions of the divided pulse to the pressure responsive means and the other of said conduits transmitting the other portion of the divided pulse to the pressure responsive means, said pressure responsive means having a member responsive to the pressure differential generated by said divided pulses, and means for causing the divided pulse portions to act on said member simultaneously.

22. In a speed sensing and control system for controlling the operation of a variable speed device such as a generator set or the like, said system having speed sensing means operable to generate a differential pressure signal representative of a variance in the speed of the variable speed device from a selected set speed, and a fluid pressure responsive actuator for adjusting the speed of the variable speed device in accordance with the fluid pressure applied to said actuator; the improvement comprising a source of fluid pressure, a differential pressure actuated valve hydraulically connected between said source and said actuator, said valve having a valve member shiftable to adjust the pressure supplied to said actuator from said source in accordance with the position of said valve member, and conduit means connecting said valve to said speed sensing means to position said valve member in accordance with the differential pressure signal generated by said sensing means.

23. In a speed sensing and control system as defined in claim 22; the further improvement wherein said system is employed to control a plurality of variable speed devices, one of said plurality of devices having said speed sensing means associated therewith whereby a differential pressure signal representative of a variance in speed of said one of said variable speed devices from a selected set speed is generated, each of said variable speed devices having an individual fluid pressure actuator associated therewith for adjusting the speed of the individual device in accordance with the pressure applied to its actuator, said actuators being connected in parallel relationship to each other.

24. In a speed sensing and control system as defined in claim 22; the further improvement wherein said valve has an internal chamber therein, said chamber communicating with said actuator, said source of fluid pressure comprising a pump having a high pressure outlet conduit communicating with one end of said chamber and a low pressure return conduit communicating with the opposite end of said chamber, said valve member having a land mounted in said chamber and movable toward one or the other end of said chamber upon shifting of said valve member to thereby variably restrict the flow of fluid through said chamber from said one end of said chamber to said other end of said chamber and thereby vary the pressure in said chamber.

References Cited

UNITED STATES PATENTS 2,879,467  3/1959  Stern _____________ 73—506 X
3,393,692  7/1968  Geary _____________ 415—29

CARROLL B. DORITY, JR., Primary Examiner

U.S. Cl. X.R.

123—140.1; 415—29